(12) United States Patent
Hosein

(10) Patent No.: US 7,706,403 B2
(45) Date of Patent: Apr. 27, 2010

(54) QUEUING DELAY BASED RATE CONTROL (75) Inventor: Patrick A. Hosein, San Diego, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 1367 days.

(21) Appl. No.: 10/721,403

(22) Filed: Nov. 25, 2003

(65) Prior Publication Data
US 2005/0111361 A1 May 26, 2005

(51) Int. Cl.
H04L 12/28 (2006.01)
H04J 3/16 (2006.01)
H04J 3/06 (2006.01)

(52) U.S. Cl. .................. 370/468; 370/519; 370/395.21

(58) Field of Classification Search ............. 370/395.1, 370/329, 332, 335, 342, 395, 468, 412, 350, 370/516, 517, 431
See application file for complete search history.

(56) References Cited

U.S. PATENT DOCUMENTS

| 5,737,312 | A  | * | 4/1998  | Sasagawa       | 370/232 |
|-----------|----|---|---------|----------------|---------|
| 5,895,258 | A  | * | 4/1999  | Song           | 438/444 |
| 6,442,139 | B1 |   | 8/2002  | Hosein         |         |
| 6,895,258 | B1 | * | 5/2005  | Scherzer et al.| 455/562.1 |
| 7,103,350 | B2 | * | 9/2006  | Au et al.      | 455/412.2 |
| 7,116,708 | B2 | * | 10/2006 | Lohtia et al.  | 375/225 |
| 2003/0219037 | A1 | * | 11/2003 | Toskala et al. | 370/496 |
| 2004/0160922 | A1 | * | 8/2004  | Nanda et al.   | 370/335 |

* cited by examiner

Primary Examiner—Hanh Nguyen
(74) Attorney, Agent, or Firm—Coats & Bennett, P.L.L.C.

(57) ABSTRACT

A method and apparatus for rate control adjusts or otherwise requests adjustment of a communication link data rate based on transmit queuing delays. For example, a mobile station may monitor expected transmit queuing delays relative to one or more delay targets or other Quality-of-Service constraints, and request reverse link rate increases or decreases accordingly. Similarly, the mobile station may be configured periodically to request reverse link rate changes based on determining the rate needed to meet targeted queuing delays for one or more service instances being supported by the mobile station in each of a succession of ongoing rate control intervals. Requested rates may be defined data rates or may be virtual rates that can be achieved by using combinations of defined data rates. Queuing-based rate control also can be applied to the base station's forward link, and, more broadly, to essentially any rate controlled communication link.

40 Claims, 5 Drawing Sheets

QUEUING DELAY BASED RATE CONTROL

BACKGROUND OF THE INVENTION

The present invention generally relates to wireless communication networks, and particularly relates to rate control in such networks.

Rate control is a form of radio link adaptation wherein the transmission rate from a transmitter to a receiver is adjusted during ongoing communications responsive to changing signal quality, network loading constraints, etc. As an example, a wireless network base station may enforce common or per-user reverse link rate control to maintain reverse link loading at or around some targeted level.

Base stations also may enforce or otherwise supervise reverse link rate control of individual mobile stations to meet Quality-of-Service (QoS) requirements that specify maximum delay or jitter limits for reverse link transmissions for particular mobile stations. For example, a given mobile station may run one or more applications, each having its own logical "service instance," and each potentially having its own QoS requirements.

Supporting reverse link rate control in this context, the base station tracks or otherwise monitors indications of reverse link performance for each mobile station, so that it can determine when rate adjustments are required for the individual mobile stations to meet QoS or other requirements. Such monitoring requires the mobile stations to provide, i.e., transmit, reverse link information to the base station. For example, the mobile stations may provide the base station with information regarding their transmit buffer sizes as an indication of whether their reverse link rates should be adjusted upward or downward.

With this approach, for example, the base station may grant a higher reverse link rate to a mobile station that has more than a certain amount of pending transmit data buffered. In other words, a large amount of pending transmit data at the mobile station may trigger the base station to grant a higher rate for one or more subsequent transmit periods. Obviously, the base station can provide such control only when it is provided with transmit buffer information from the mobile stations. Thus, the need for additional signaling between the mobile stations and the base station is one drawback of this approach.

Another drawback stems from the approach's failure to directly indicate a pending service problem, i.e., knowledge of a given mobile's transmit buffer size does not equate to direct knowledge of whether the mobile station's reverse link performance is at risk of violating QoS or other service constraints. For example, the average reverse link throughput of the mobile station may be quite high at the current time and, thus, one would expect even a relatively large transmit buffer to drain quickly. Thus, in addition to receiving transmit buffer size reports from the mobile stations, which undesirably adds overhead signaling to the finite-capacity reverse link, the base station generally has to monitor other conditions, or calculate additional metrics, to determine whether rate adjustments are needed for particular mobile stations.

SUMMARY OF THE INVENTION

The present invention comprises a method and apparatus wherein transmit rate adjustments are triggered or otherwise initiated based on expected transmit queuing delays. For example, if a first transceiver is transmitting data to a second transceiver subject to one or more service constraints, e.g., delay, jitter, etc., it may initiate rate changes for that radio link responsive to its evaluation of expected transmission queuing delays. For example, if the current queue size and current average throughput are such that length of time to empty the queue likely will violate a delay constraint, then the first transceiver may request or otherwise initiate a rate increase. In general, transceivers evaluate their expected queuing delay (s) in light of known service constraints and determine whether or not to initiate or request correspondingly appropriate rate changes.

In an exemplary embodiment, the present invention is applied to the reverse links between mobile stations and base stations in a wireless communication network, although it should be understood that the present invention can be applied to wireless, wired (electrical, optical, etc.) communication links. Thus, an exemplary method of reverse link rate control at a mobile station comprises determining targeted queuing delays for reverse link transmit data, monitoring transmit data queue sizes and reverse link throughput at the mobile station, and generating reverse link rate requests based on the transmit data queue sizes, the reverse link throughput, and the targeted queuing delays. The mobile station may determine targeted delays based on QoS information received from the network that may be specific to each service instance being supported by the mobile station. Thus, the mobile station may receive targeted queuing delay information for one or more service instances being supported by the mobile station, periodically calculate an expected queuing delay for each service instance, and request a reverse link rate increase if any expected queuing delay exceeds a first delay value based on a targeted delay for the corresponding service instance, or request a reverse link rate decrease if the expected queuing delay for each service instance falls below a second delay value based on the targeted delay for the service instance.

Another exemplary embodiment comprises receiving targeted queuing delay information for one or more service instances being supported by the mobile station, and periodically calculating an overall data rate required to achieve targeted queuing delays for the service instances and requesting a rate change based on the overall data rate. The mobile station may periodically calculate an overall data rate required to achieve targeted queuing delays for the service instances by calculating a required data rate for each service instance needed to achieve the targeted queuing delay for that service instance in a next rate control period, and calculating the overall data rate based on the required data rates of the service instances. With the overall data rate thus calculated, the mobile station may request the nearest appropriate defined data rate, assuming that the mobile station is constrained to operate at one in a set of defined data rates.

Alternatively, the mobile station may use a rate dithering approach, wherein it maps the desired overall rate into an "effective" or "virtual" data rate that can be achieved using one or more combinations of defined data rates. The mobile station would thus request the appropriate virtual rate. In turn, an exemplary base station comprises transmitter circuits to transmit signals to a plurality of mobile stations, receiver circuits to receive signals from a plurality of mobile stations, and processing circuits, including a rate control processor, to determine whether to deny or grant rate adjustment requests received from one or more mobile stations and to grant non-standard rate requests by mapping each non-standard rate request into a standard set of rates based on selecting one or more combinations of the standard rates.

Of course, the present invention is not limited by these exemplary details. Moreover, those skilled in the art will recognize additional features and advantages provided by the present invention upon reading the following discussion, and upon viewing the accompanying figures.

DETAILED DESCRIPTION OF THE INVENTION

Figure 1:
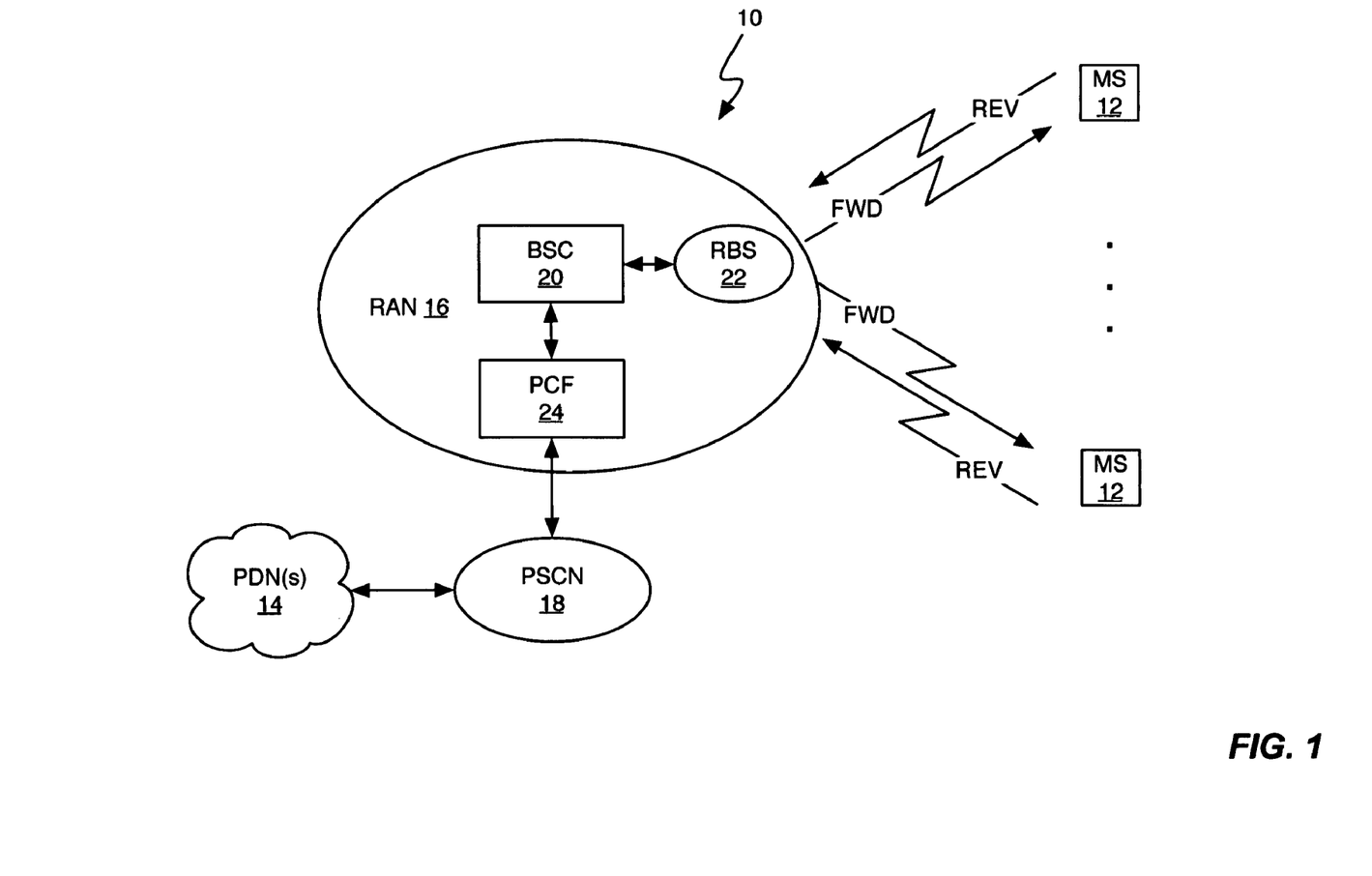
FIG. 1 is a diagram of an exemplary wireless communication network according to an exemplary embodiment of the present invention.

FIG. 1 illustrates an exemplary wireless communication network 10 that communicatively couples a plurality of mobile stations 12 to one or more Public Data Networks (PDNs) 14, such as the Internet. As illustrated, network 10 comprises a Radio Access Network (RAN) 16 that is coupled to the PDNs 14 a Packet Switched Core Network (PSCN) 18, which may comprise various Internet Protocol (IP) packet routers, gateways, and one or more authentication/authorization entities. Those skilled in the art should thus appreciate that network 10 as depicted is simplified for clarity and in actuality may include additional elements, such as Circuit Switched Core Network (CSCN) coupling RAN 16 to the Public Switched Telephone Network (PSTN). Further, it should be noted that network 10 may be configured according to various network standards, such as, among others, IS-2000 or Wideband CDMA (WCDMA) standards.

Regardless, RAN 16 provides the wireless interface to the mobile stations 12 via forward and reverse radio links that may support per-mobile forward and reverse link traffic and control channels, one or more "broadcast" channels used for paging and common control, and one or more shared channels subject to scheduled use. In any case, an exemplary RAN 16 comprises one or more base stations, each comprising a Base Station Controller (BSC) 20 and one or more associated Radio Base Stations (RBSs) 22. BSC 20 may include packet data processing functionality for direct connection to PSCN 18, or may be coupled to PSCN 18 through a Packet Control Function (PCF) 24 or like entity.

In an exemplary embodiment as applied to reverse link rate control of the mobile stations 12, each mobile station 12 has a rate-controlled reverse link channel, e.g., a Reverse Link Packet Data Channel (R-PDCH) assigned to it, and the data rate of that channel can be adjusted upward or downward by the RBS 22 responsive to rate control request messages sent from the mobile station 12. Thus, according to FIG. 2, network 10 may send QoS information, e.g., targeted queuing delay information or other service constraint information, to the mobile station 12 from which it determines targeted reverse link transmit queuing delays (Step 100). That is, if a given service instance being supported by the mobile station has specific delay or jitter constraints associated with it, then there are limits on how long data to be transmitted from the mobile station 12 for that service instance can "wait" in the mobile station's transmit queue.

Figure 2:
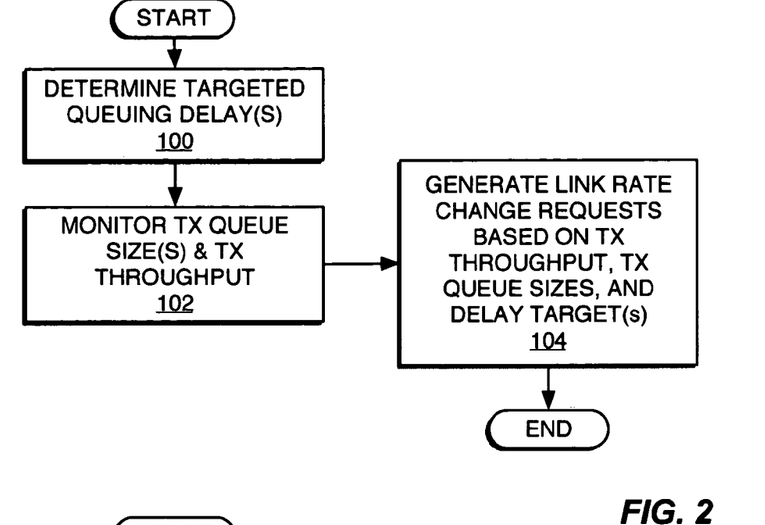
FIG. 2 is a diagram of exemplary queuing delay based rate control processing.

In operation, then, mobile station 12 monitors its transmit buffer size, i.e., its transmit data queue(s), and keeps track of its average reverse link throughput (Step 102). By maintaining a running average or other periodically updated estimate of its reverse link throughput, the mobile station 12 can estimate how long given data will remain in its transmit queue, or how long it will take to drain data that already is queued. Thus, mobile station 12 can generate link rate change requests based on the average throughput, the queue size(s), and the targeted queuing delays (Step 104). In other words, the mobile station 12 generates rate change requests based on determining expected reverse link queuing delays and evaluating those expected delays relative to one or more service constraints. Those skilled in the art will appreciate that the same or similar logic could be applied by the RBS 22 or BSC 20 to the forward link, wherein expected queuing delays could be used to trigger forward link transmit rate adjustments, changes in forward link scheduling priorities, or both.

Figure 3:
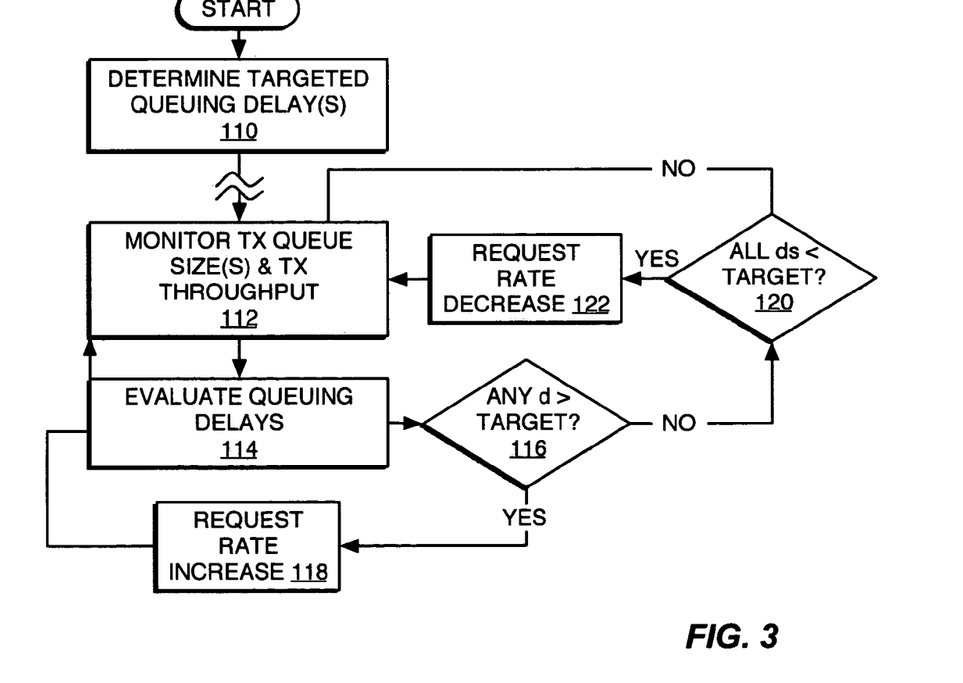
FIG. 3 is a diagram of exemplary event-triggered rate control processing.

FIG. 3 illustrates an exemplary event-triggered embodiment wherein the mobile station 12 determines targeted queuing delays for each service instance being supported by it (Step 110). In operation, then, mobile station 12 monitors the transmit queue size and throughput for each service instance (Step 112), and periodically evaluates the expected queuing delay for each service instance (Step 114). If the expected queuing delay of any service instance exceeds the targeted delay for that service instance (Step 116), mobile station 12 may initiate a rate increase by sending a rate change request message to RBS 22. If none of the expected queuing delays exceed their corresponding target delays, mobile station 12 may check whether all of the expected delays fall below corresponding targeted delays (Step 122). If so, mobile station 12 may initiate a rate decrease by sending a rate change request message to RBS 22. Note that the comparison of expected-to-targeted queuing delays for rate increases may be different than for rate decreases. That is, the mobile station 12 may implement hysteresis or other rate change smoothing control by calculating different target delays for use in Steps 116 and 120.

In looking at target delay calculations in more detail, one may assume that each mobile station 12 is provided with either a maximum Radio Link Protocol (RLP) buffer delay requirement or a target delay value that should be maintained in order to reduce jitter at the initiation of each service instance. One also may assume that the user class, if any, of the mobile station 12 is known. Such information, if desired, may be used to determine the settings for certain rate control parameters. For example, if a maximum delay threshold of $\tau_{max}$ is required then one may define an associated target delay value as $\tau = \theta \cdot \tau_{max}$, wherein the value of $\theta$ depends on, for example, the outage probability of the application, i.e., the probability that the delay exceeds the specified threshold $\tau_{max}$, and the user class of the mobile station 12. An exemplary method attempts to maintain the average queuing delay at $\tau$. If a target delay is specified for jitter guarantees, then mobile station 12 may be configured to set the target delay to that value.

Thus, let $\tau_i$ denote the target delay for service instance i. On a periodic basis, such as every T seconds, mobile station 12 computes a filtered estimate $u_i$ in bits-per-second (bps) of the throughput so far achieved for service instance i. It also monitors the present size $b_i$ in bits of the transmit queue for the service instance and estimates the expected queuing delay of a pending RLP frame to be transmitted as by $d_i = b_i/u_i$. If $d_i > \alpha \tau_i$ for any service instance i, then mobile station 12 transmits a rate increase request to RBS 22. Conversely, if $d_i < \beta \tau_i$ for all service instances, the mobile station 12 sends a rate decrease request to RBS 22. Otherwise, mobile station 12 may choose to maintain its present reverse link rate. The parameters $0 \leq \alpha \leq 1$ and $0 \leq \beta \leq 1$ may be determined by the user class of mobile station 12. For example, both parameters can be set closer to one as the user class preference increases. In the case of a jitter constrained application these parameters also may depend on the tightness of the jitter constraints. Naturally this approach can be generalized to multiple thresholds.

In any case, the rate request transmitted from the mobile station 12 will depend on the threshold region within which the present delay estimate lies. Before sending a rate increase request, the mobile station 12 first checks to see if its power headroom is large enough to support the higher rate. If not, the request is not sent. Additionally, one can enhance the above operations by taking into account the effect of a rate request command. For example, if a rate increase request is granted then in the next rate control period the mobile station's queue will drain twice as fast, assuming that a grant results in a doubling of data rate. Conversely, if a rate decrease is granted then the queue will drain half as fast, again assuming that a rate decrease halves the data rate. Such information can be used in making better decisions for α, β, T, and the buffer size(s). For example, the values of α and β can be set based on the granularity of the defined rate change steps. Here, one notes that the mobile station's buffer capacities implicitly are assumed to be sufficient to support a queue equal to the product of the maximum rate and the maximum target delay. If not, then Adaptive Queue Management (AQM) techniques may be used.

Figure 4:
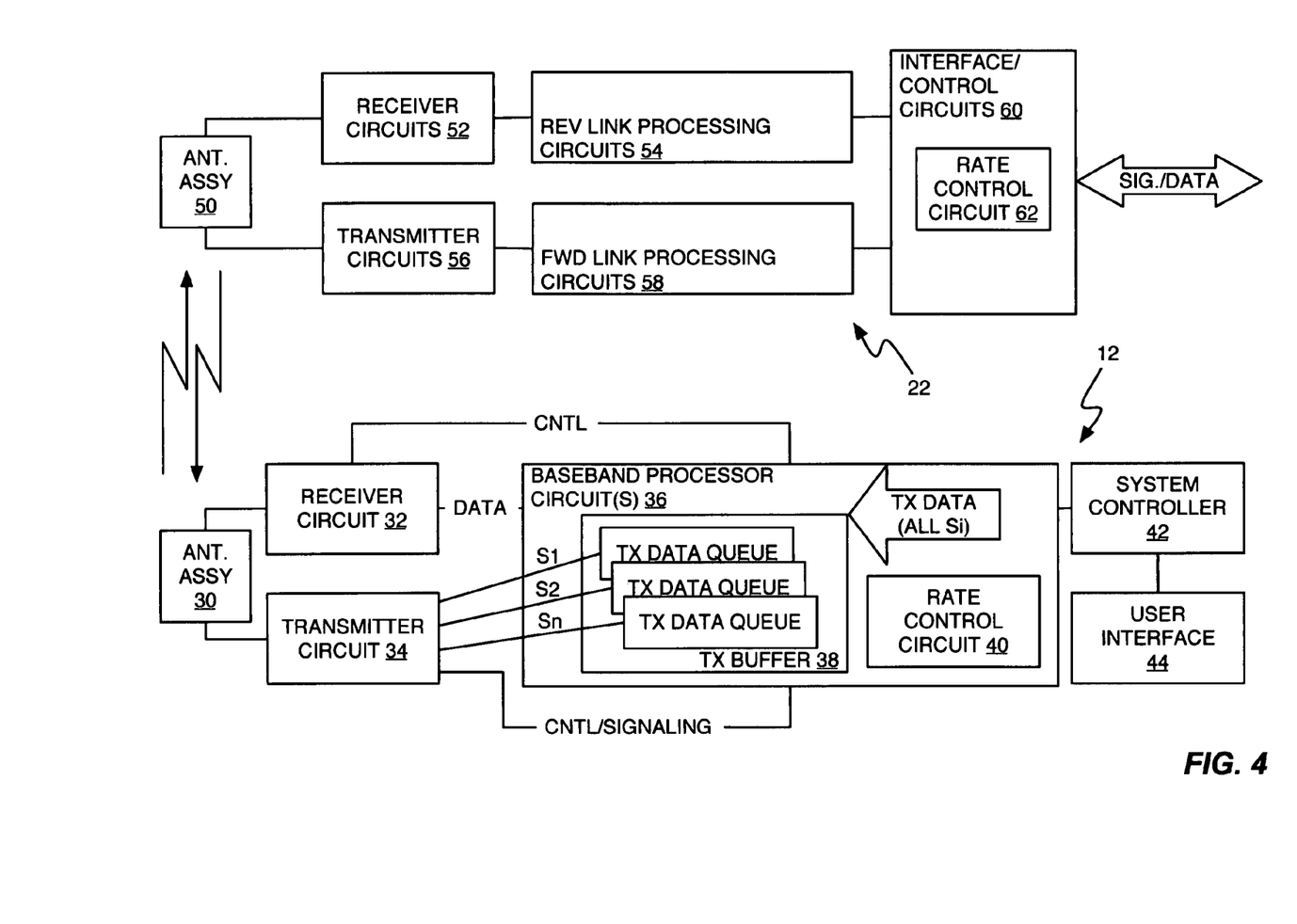
FIG. 4 is a diagram of exemplary base and mobile stations.

Mobile stations 12 may be configured to support the above and other exemplary embodiments of the present invention. By way of non-limiting example, FIG. 4 illustrates exemplary mobile station and RBS configurations that may be used to support the present invention as applied to either or both forward and reverse link rate control. Mobile station 12 comprises an antenna assembly 30, a receiver circuit 32, a transmitter circuit 34, a baseband processor circuit 36, including transmit buffer memory 38 and a rate control circuit 40, and further comprises a system controller 42 and an associated user interface 44. RBS 22 comprises receive/transmit antenna elements 50, pooled receiver circuits 52 and associated reverse link processing circuits 54, pooled transmitter circuits 56 and associated forward link processing circuits 58, and interface and control circuits 60, including a rate/scheduling control circuit 62. Those skilled in the art should appreciate that these mobile station and RBS depictions represent exemplary functional arrangements and, because these entities typically comprise one or more microprocessor/digital signal processors, or collections of such processing resources, other functional arrangements may be used as needed or desired.

Regarding mobile station 12, rate control circuit 40, which may be implemented in hardware, software, or some combination thereof, functions as a rate controller that perform exemplary rate control processing in accordance with the present invention. Thus, it may track or otherwise have access to average throughput information for all service instances being supported by mobile station 12, and may monitor transmit buffer queue sizes as part of its rate control operations. Thus, it may monitor queue size and throughput information for each service instance being supported by the mobile station 12, and generate rate control requests for transmission to RBS 22. In turn, RBS 22, e.g., via rate/scheduling control circuit 62, may respond to those requests accordingly. For example, if mobile station 12 transmits a rate increase request, RBS 22 and/or BSC 20 may grant or deny the request according to ongoing loading conditions or other criteria.

In another exemplary embodiment, mobile station 12 may be configured to embody the processing logic of FIG. 4, wherein queuing delay-based rate control is performed on a periodic basis. Such an approach may be used to maintain the average queuing delay at or near some specified value. With this approach, the mobile station may, for each service rate, compute the reverse link data rate that, if used in the next control interval, results in an expected delay of $\tau_i$ at the end of the control interval. In other words, mobile station 12 consistently attempts to change the rate so that the targeted queuing delay is achieved at the end of the control interval. Thus, the rate, $\lambda_i$, that should be requested for the next rate control interval is given by, $$\lambda_i = \frac{u_i \tau_i - b_i}{T} + u_i,$$

which gives the desired rate for service instance i. Thus, the overall data rate required for the next rate control service interval is determined based on the desired rates of all service instances included in the evaluation, which typically comprises all service instances being supported by the mobile station 12. Thus, the overall rate, $\lambda$, that should be requested for the next rate control interval that will allow the mobile station 12 to achieve the targeted queuing delays for all service instances of concern is given as $$\lambda = \sum_{i=1}^{i=N} \lambda_i.$$

Commonly, however, only defined data rates may be requested by mobile station 12. That is, the network standards on which network 10 is configured, e.g., IS-2000, WCDMA, etc., may provide for a set of defined reverse link data rates. Thus, mobile station 12 may be configured to map the overall desired data rate into the set of defined data rates based on selecting the closest defined rate that will allow it to at least meet the targeted queuing delays over the next control interval. The selected rate, $\hat{\lambda}$, is thus requested by the mobile station 12.

As an alternative to choosing a defined rate, the mobile station 12 and network 10 may be configured to adopt a "rate dithering" approach, wherein the mobile station 12 and RBS 22 or BSC 20 are configured with "virtual rate" tables that represent effective data rates that can be achieved by assigning one or more combinations of defined data rates. For example, suppose that the mobile station 12 determines an overall desired rate, $\lambda$, as the summation of the targeted rates, $\lambda_i$, for all service instances i. Rather than mapping the overall rate into the defined rate set, mobile station 12 computes or otherwise selects a virtual data rate, e.g., from configured data in its memory, and transmits a request to the RBS 22 that identifies that virtual rate. In turn, RBS 22 or BSC 20 processes that virtual rate by determining the appropriate combination of defined rates that will effect that virtual rate over some defined number of transmit intervals. Such mapping may be based on configured virtual rate tables held in memory at the RBS 22 that maps virtual rates to corresponding combinations of defined rates and transmit intervals.

Thus, in one embodiment, both mobile station 12 and RBS 22 (or BSC 20) contain tables that map combinations of N (non-unique) rates to the corresponding average rate. Assuming K supportable rates, then such mapping results in $K^N$ "virtual" rates. Note that the method may take into account re-transmissions, etc., in such computations. Mobile station 12 thus can map the desired overall rate to the nearest virtual rate and send the request to the RBS 22, which in turn looks up the sequence of defined rates that should be granted to the mobile station 12 for the next N frames that achieves this virtual rate. Use of virtual rates in this manner reduces rate fluctuations associated with servicing the transmit queues, while still meeting the desired QoS guarantees. By way of non-limiting example, assume that N=2, and that defined rates 2, 3, and 4 are supported and an average of two transmissions is needed per frame. The possible virtual rates (after H-ARQ) are 1, 1.25, 1.5, 1.75, and 2. If, for example, the mobile station 12 requires a rate of 1.23 it can request a rate of 2×1:25=2:5 from the RBS 22. In turn, the RBS 22 can allow the mobile station 12 to achieve this rate by granting it a rate of 3 for a first transmit frame and a rate of 2 for the second transmit frame.

Figure 5:
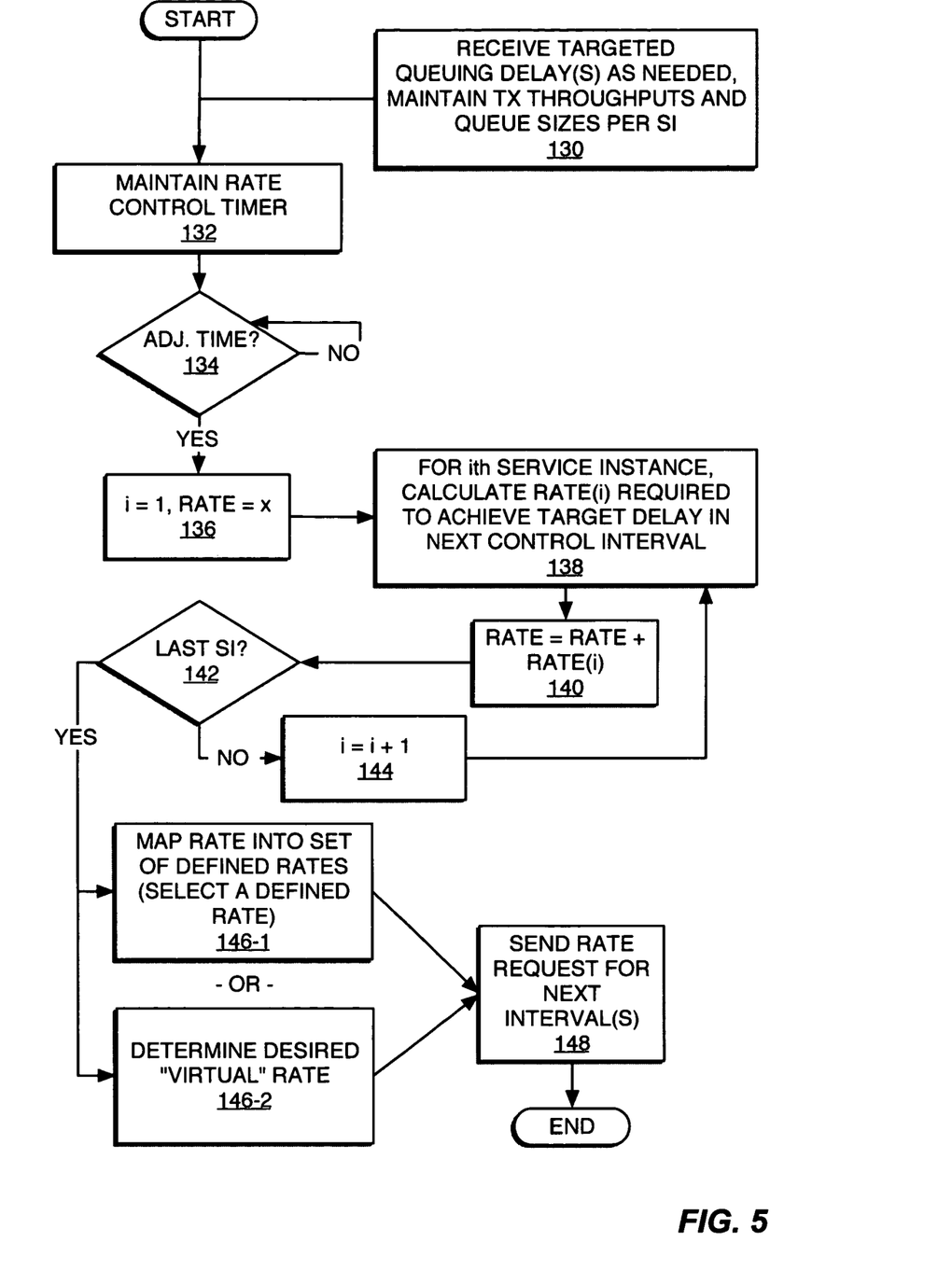
FIG. 5 is a diagram of exemplary periodic averaging/dithering rate control processing.

FIG. 5 illustrates exemplary processing logic to implement the above rate average and rate dithering methods. Processing begins with the assumption that mobile station 12 receives targeted queuing delay or other QoS information as needed for each service instance, and that it maintains ongoing throughput and queue size information values as needed for each service instance (Step 130). For periodic rate control adjustment, mobile station 12 may be configured to implement a rate control timer in hardware or software that sets the control interval for rate adjustments (Step 132). If it is time for a rate control adjustment (Step 134), mobile station 12 computes a target data rate needed to achieve the targeted queuing delay for each service instance i as explained above.

Mobile station 12 initializes i to 1 and sets its overall desired rate to "x," which may be zero or some other value (Step 136). For the ith service instance, mobile station 12 calculates the target rate required to achieve the targeted delay in the next control interval (Step 138), and adds that rate to the overall desired rate (Step 140). If there are more service instances (Step 142), mobile station 12 increments i and repeats the target rate and overall desired rate calculations for the next service instance.

Upon finishing such calculations for the last service instance, the mobile station 12 may perform either the defined rate or virtual rate mapping as described above (Step 146-1 or 146-2). That is, mobile station 12 may directly map the overall desired rate into the set of defined rates, or it may map that value into a set of virtual rates. In either case, mobile station 12 sends a rate request message for the next rate control interval (Step 148).

Figure 6:
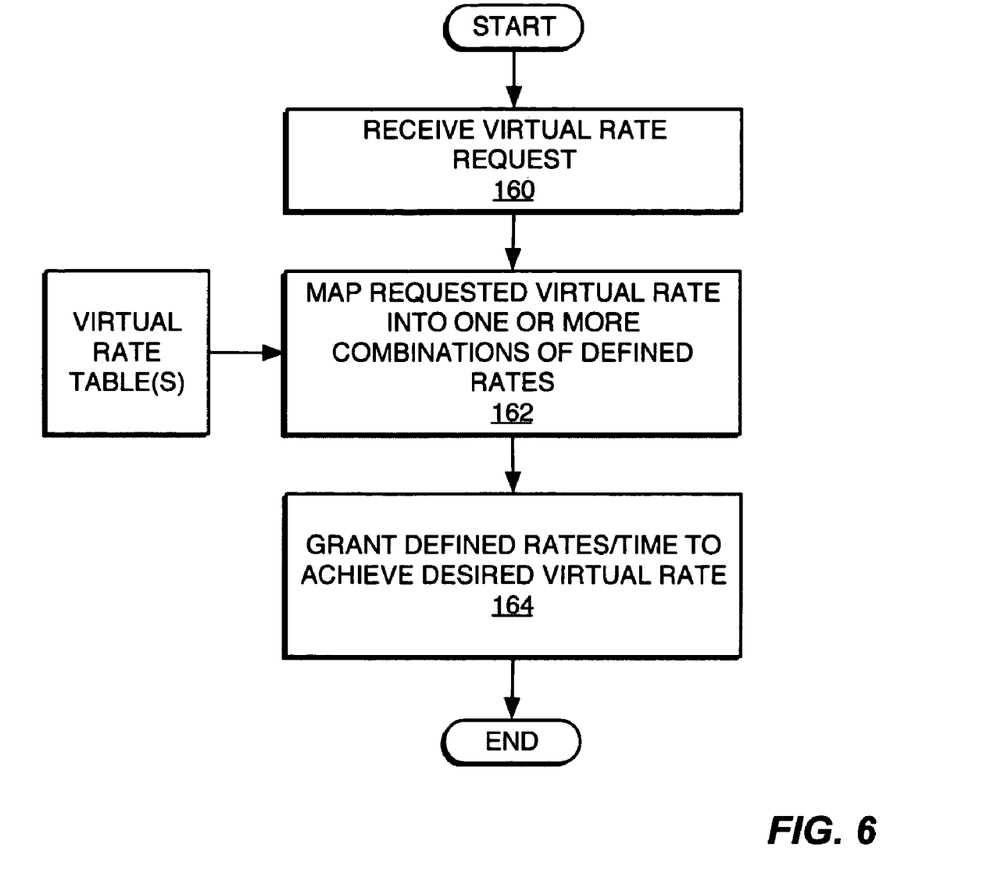
FIG. 6 is a diagram of exemplary virtual rate mapping.

Assuming that mobile station 12 requested a virtual rate, FIG. 6 illustrates exemplary processing at RBS 22, wherein the RBS 22 receives the rate control request identifying the requested virtual rate (Step 160). RBS 22 accesses its stored virtual rate table(s) to look up the combination of defined rates and corresponding transmit intervals that should be used to achieve the virtual rate (Step 162). In this respect, rate/scheduling control circuit 62, or some other digital processing logic circuit in RBS 22, can be configured to access a memory-based lookup table that is configured with the virtual-to-defined rate mappings. Regardless, RBS 22 determines the corresponding standard rates and grants them to mobile station 12 for the required number of frames (Step 164).

Of course, those skilled in the art will recognize that rate dithering using such virtual rates, or rate average as described above, are not essential to the present invention. Indeed, whether event-triggered, or driven by periodic rate averaging/dithering, the present invention provides a method whereby radio link rate adjustments are made based on the evaluation of expected/targeted queuing delays relative to QoS requirements or other performance constraints.

Such radio link adjustments, as noted earlier herein, are not limited to the reverse link and, indeed, the present invention provides exemplary queuing-based forward link control in one or more base station embodiments. For example, various third generation (3G) network standards, such as 1XEV-DV, 1XEV-DO, and WCDMA, use a shared high-speed channel in the forward link to transmit data for a plurality of data connections corresponding to a group of users, i.e., a given group of mobile stations 12. At any given instant, the shared channel typically carries traffic for only one data connection, but over time all users receive data via the shared channel based on "scheduling" operations carried out at RBS 22, wherein the RBS 22 transmits traffic for selected data connection(s) in each of an ongoing sequence of scheduling intervals.

Thus, in such embodiments, RBS 22 allows users to time-share one or more forward link communication channels, and assigns a scheduling utility function to each data connection of a user sharing the channel. In an exemplary embodiment, rate/scheduling control circuit 62 is configured to implement a scheduler that tries to maximize the total utility function, which may be based on joint evaluation of the individual utility functions. In any case, if a particular data connection has a delay constraint (e.g, a limit on the maximum delay or a jitter constraint) then this constraint can be included in the corresponding utility function. Thus, the scheduling priority of a given data connection may be made dependent on the expected queuing delays for that connection and, in particular, may be made to depend on the expected queuing delays relative to that connection's targeted queuing delays.

For example, rate/scheduling control circuit 62 may receive or have access to QoS constraints associated with one or more of the data connections. Thus, a given data connection may have a jitter-imposed targeted queuing delay of qt, and the rate/scheduling control circuit 62 may be configured to maintain the queuing delay as close as possible to qt. As such, the utility function for that data connection can be configured as $U(q)=-(q-qt)^2$, where the expected queuing delay, q, is estimated as described above for the reverse link. RBS 22 maintains an estimate of the forward link throughput for the data connection and, whenever a scheduling decision is to be made, it estimates the delay as the ratio of the queue length and the throughput. Thus, RBS 22 can detect when the expected queuing delays of any data connection exceed that connection's targeted delays and adjust the scheduling priorities accordingly. Therefore, RBS 22 applies essentially the same logic as the mobile station does in making rate control requests based on queuing delays but instead of making rate requests, RBS 22 changes user scheduling priorities based on queuing delays.

Of course, it should be understood that rate/scheduling control circuit 62 can be configured to make scheduling adjustments and/or make forward link rate adjustments based on expected queuing delays. For example, if RBS 22 serves a plurality of mobile stations 12 using dedicated, rate-adjustable forward link communication channels, rate/scheduling control circuit 62 can be configured to initiate rate adjustments on those channels as a function of expected versus targeted queuing delays for outgoing traffic.

Therefore, the present invention may be applied to forward and reverse link rate control, forward link scheduling control, or to combinations thereof in a variety of wireless communication network types. Indeed, the present invention is not limited to wireless applications and may be applied to both wireless and wired communication links. As such, the present invention is not limited by the foregoing discussion and, indeed, is limited only by the following claims and their reasonable equivalents.

What is claimed is:

1. A method of reverse link rate control at a mobile station comprising:
   determining targeted queuing delays at the mobile station for reverse link transmit data;
   monitoring transmit data queue sizes and ongoing reverse link throughput at the mobile station expressed as current average throughput for data transmissions by the mobile terminal on the reverse link; and
   generating reverse link rate requests at the mobile station based on determining whether targeted queuing delay violations are expected given the transmit data queue sizes and the ongoing reverse link throughput, the reverse link rate requests being further based on, in each rate control period, determining a data rate needed substantially to meet targeted queuing delays in the next rate control period for each service instance being supported by the mobile station.

2. The method of claim 1, wherein determining targeted queuing delays for reverse link transmit data comprises determining a targeted queuing delay for each service instance being supported by the mobile station.

3. The method of claim 2, wherein monitoring transmit data queue sizes and ongoing reverse link throughput comprises monitoring a transmit data queue size and an ongoing reverse link throughput for each service instance.

4. The method of claim 3, wherein generating reverse link rate requests based on the transmit data queue sizes, the ongoing reverse link throughput, and the targeted queuing delays comprises determining whether an expected queuing delay of any service instance exceeds a target queuing delay for that service instance and, if so, requesting a reverse link rate increase.

5. The method of claim 3, wherein generating reverse link rate requests based on the transmit data queue sizes, the ongoing reverse link throughput, and the targeted queuing delays comprises determining whether expected queuing delays for all service instances are below target queuing delays defined for the service instances and, if so, requesting a reverse link rate decrease.

6. The method of claim 2, wherein determining a targeted queuing delay for each service instance being supported by the mobile station comprises receiving service instance delay requirements from a wireless communication network supporting the mobile station.

7. The method of claim 1, wherein generating reverse link rate requests based on the transmit data queue sizes, the ongoing reverse link throughput, and the targeted queuing delays comprises generating reverse link rate requests on an event-triggered basis by comparing expected queuing delays for each of one or more service instances to targeted queuing delays associated with those service instances.

8. The method of claim 1, wherein generating reverse link rate requests based on the transmit data queue sizes, the ongoing reverse link throughput, and the targeted queuing delays comprises generating reverse link rate requests on a periodic basis to control an average queuing delay of the mobile station relative to a targeted queuing delay.

9. The method of claim 1, wherein determining a data rate needed substantially to meet targeted queuing delays in the next rate control period for each service instance being supported by the mobile station comprises:
   for each service instance, computing a data rate required to meet the targeted queuing delay for that service instance in the next rate control period; and
   calculating an aggregate data rate based on the data rates computed for the service instances being supported by the mobile station.

10. The method of claim 9, further comprising selecting one among a set of defined data rates based on the calculated aggregate data rate, and requesting the selected one of the defined data rates for the next rate control period.

11. The method of claim 1, wherein generating reverse link rate requests based on the transmit data queue sizes, the ongoing reverse link throughput, and the targeted queuing delays comprises determining a required data rate that satisfies a targeted queuing delay for reverse link data transmissions over a given interval, calculating an effective data rate from the required data rate that can be achieved using one or more combinations of defined data rates, and requesting the effective data rate.

12. A method of reverse link rate control at a mobile station comprising:
   receiving targeted queuing delay information for one or more service instances being supported by the mobile station;
   periodically calculating an expected queuing delay at the mobile station for each service instance;
   requesting a reverse link rate increase by the mobile station if any expected queuing delay exceeds a first delay value based on a targeted delay for the corresponding service instance; and
   requesting a reverse link rate decrease by the mobile station if the expected queuing delay for each service instance falls below a second delay value based on the targeted delay for the service instance,
   wherein requesting a reverse link rate increase or decrease is based on, in each rate control period, determining a data rate needed substantially to meet targeted queuing delays in the next rate control period for each service instance being supported by the mobile station.

13. The method of claim 12, further comprising computing the first delay value for each service instance by scaling the targeted delay for that service instance by a first factor and computing the second delay value for each service instance by scaling the targeted delay for that service instance by a second factor.

14. The method of claim 13, further comprising setting at least one of the first and second factors based on a granularity of defined rate change steps.

15. The method of claim 13, further comprising setting at least one of the first and second factors based on a subscriber class association of the mobile station.

16. The method of claim 13, further comprising adjusting a rate control interval for periodically calculating the expected queuing delay for each service instance based on whether a requested reverse link rate increase or decrease was granted.

17. The method of claim 12, wherein periodically calculating an expected queuing delay for each service instance comprises, for each service instance, calculating an expected queuing delay for one or more Radio Link Protocol (RLP) frames to be transmitted based on an average transmit data throughput for that service instance, and a current queue size for that service instance.

18. The method of claim 17, further comprising tracking an average transmit data throughput for each service instance.

19. A method of reverse link rate control at a mobile station comprising:
   receiving targeted queuing delay information for one or more service instances being supported by the mobile station; and periodically calculating an overall data rate required to achieve targeted queuing delays for the service instances and requesting a rate change by the mobile station based on the overall data rate, wherein requesting a rate change is based on, in each rate control period, determining a data rate needed substantially to meet targeted queuing delays in the next rate control period for each service instance being supported by the mobile station.

20. The method of claim 19, wherein periodically calculating an overall data rate required to achieve targeted queuing delays for the service instances comprises:

calculating a required data rate for each service instance needed to achieve the targeted queuing delay for that service instance in a next rate control period; and calculating the overall data rate based on the required data rates of the service instances.

21. The method of claim 19, wherein requesting a rate change based on the overall data rate comprises requesting one in a set of defined data rates that will allow the mobile station to achieve the targeted queuing delays for the service instances.

22. The method of claim 19, wherein requesting a rate change based on the overall data rate comprises selecting an effective data rate based on the overall data rate, wherein the effective data rate represents one or more combinations of defined data rates and corresponding transmit intervals.

23. A mobile station for use in a wireless communication network comprising:

a receiver circuit to receive signals transmitted by the network;

a transmitter circuit to transmit signals, including rate requests, to the network; and a rate controller circuit configured to:

determine targeted queuing delays for reverse link transmit data;

monitor transmit data queue sizes and ongoing reverse link throughput at the mobile station, the ongoing reverse link throughput being expressed as current average throughput for data transmissions by the mobile station on a reverse link; and generate reverse link rate requests based on determining whether targeted queuing delay violations are expected given the transmit data queue sizes and the ongoing reverse link throughput, the reverse link rate requests being further based on, in each rate control period, determining a data rate needed substantially to meet targeted queuing delays in the next rate control period for each service instance being supported by the mobile station.

24. The mobile station of claim 23, wherein the rate controller circuit is configured to determine targeted queuing delays for reverse link transmit data by determining a targeted queuing delay for each service instance being supported by the mobile station.

25. The mobile station of claim 24, wherein the rate controller circuit is configured to monitor transmit data queue sizes and ongoing reverse link throughput at the mobile station by monitoring a transmit data queue size and an ongoing reverse link throughput for each service instance.

26. The mobile station of claim 25, wherein the rate controller circuit is configured to generate reverse link rate requests based on the transmit data queue sizes, the ongoing reverse link throughput, and the targeted queuing delays by determining whether an expected queuing delay of any service instance exceeds a target queuing delay for that service instance and, if so, requesting a reverse link rate increase.

27. The mobile station of claim 25, wherein the rate controller circuit is configured to generate reverse link rate requests based on the transmit data queue sizes, the ongoing reverse link throughput, and the targeted queuing delays by determining whether expected queuing delays for all service instances are below target queuing delays defined for the service instances and, if so, requesting a reverse link rate decrease.

28. The mobile station of claim 24, wherein the rate controller circuit is configured to determine a targeted queuing delay for each service instance being supported by the mobile station by receiving service instance delay requirements from a wireless communication network supporting the mobile station.

29. The mobile station of claim 23, wherein the rate controller circuit is configured to generate reverse link rate requests based on the transmit data queue sizes, the ongoing reverse link throughput, and the targeted queuing delays by generating reverse link rate requests on an event-triggered basis by comparing expected queuing delays for each of one or more service instances to targeted queuing delays associated with those service instances.

30. The mobile station of claim 23, wherein the rate controller circuit is configured to generate reverse link rate requests based on the transmit data queue sizes, the ongoing reverse link throughput, and the targeted queuing delays by generating reverse link rate requests on a periodic basis to control an average queuing delay of the mobile station relative to a targeted queuing delay.

31. The mobile station of claim 23, wherein the rate controller circuit is configured to determine a data rate needed substantially to meet targeted queuing delays in the next rate control period for each service instance being supported by the mobile station by:

for each service instance, computing a data rate required to meet the targeted queuing delay for that service instance in the next rate control period; and calculating an aggregate data rate based on the data rates computed for the service instances being supported by the mobile station.

32. The mobile station of claim 31, wherein the rate controller circuit is configured to select one among a set of defined data rates based on the calculated aggregate data rate, and request the selected one of the defined data rates for the next rate control period.

33. The mobile station of claim 23, wherein the rate controller circuit is configured to generate reverse link rate requests based on the transmit data queue sizes, the ongoing reverse link throughput, and the targeted queuing delays by determining a required data rate that satisfies a targeted queuing delay for reverse link data transmissions over a given interval, calculating an effective data rate from the required data rate that can be achieved using one or more combinations of defined data rates, and requesting the effective data rate.

34. A method of forward link control at a radio base station comprising:

determining targeted queuing delays at the radio base station for one or more data connections being used to serve a plurality of mobile stations on one or more forward link communication channels;

determining expected queuing delays at the radio base station for the data connections by monitoring transmit data queue sizes and forward link throughput for the data connections;

adjusting at least one of a scheduling priority and a forward link data rate at the radio base station for a given data connection based on the expected and targeted queuing delays; and configuring scheduling utility functions used to determine the scheduling priorities of the data connections to be dependent on the expected queuing delays so that the priority for each data connection increases if the expected queuing delay exceeds the targeted queuing delay of the data connection.

35. The method of claim 34, wherein the one or more data connections are supported on a shared forward link communication channel that serves the plurality of mobile stations, and wherein adjusting at least one of a scheduling priority and a forward link data rate for a given data connection based on the expected and targeted queuing delays comprises adjusting the scheduling priority of one or more data connections over one or more scheduling intervals responsive to determining that the expected queuing delays exceed the targeted queuing delays.

36. The method of claim 34, wherein adjusting at least one of a scheduling priority and a forward link data rate for a given data connection based on the expected and targeted queuing delays comprises in a given forward link service interval, adjusting the forward link data rate for the given connection responsive to determining that the expected queuing delay exceeds the targeted queuing delay.

37. The method of claim 34, wherein determining targeted queuing delays for one or more data connections being used to serve a plurality of mobile stations on one or more forward link communication channels comprises determining Quality-of-Service requirements associated with each data connection.

38. A base station for use in a wireless communication network comprising:

transmitter circuits to transmit signals to a plurality of mobile stations receiver circuits to receive signals from a plurality of mobile stations; and processing circuits, including a rate control processor, to determine whether to deny or grant rate adjustment requests received from one or more mobile stations and to grant non-standard rate requests by mapping each non-standard rate request into a standard set of rates based on selecting one or more combinations of the standard rates.

39. The base station of claim 38, wherein mapping each non-standard rate request into a standard set of rates based on selecting one or more combinations of the standard rates comprises selecting at least a first standard rate to be used by a requesting mobile station for a first number of transmit intervals and a second standard rate to be used by the requesting mobile station for a second number of transmit intervals.

40. The base station of claim 38, wherein mapping each non-standard rate request into a standard set of rates based on selecting one or more combinations of the standard rates comprises selecting two or more standard rates to be used by a requesting mobile station over one or more defined transmit intervals such that an effective rate achieved by the requesting mobile station over the one or more defined transmit intervals substantially equals the non-standard rate requested by the requesting mobile station.

* * * * *